(12) United States Patent
Wilkins

(10) Patent No.: US 6,223,596 B1
(45) Date of Patent: May 1, 2001

(54) PORTABLE CLAMP-ON LIQUID LEVEL INDICATOR GAUGE

(75) Inventor: Larry C. Wilkins, Georgetown, IN (US)

(73) Assignee: Electromechanical Research Laboratories, Inc., New Albany, IN (US)

(*) Notice: Subject to any disclaimer, the term of this patent is extended or adjusted under 35 U.S.C. 154(b) by 0 days.

(21) Appl. No.: 09/340,885

(22) Filed: Jun. 28, 1999

(51) Int. Cl.[7] .......................... G01F 23/30; G01F 23/56; G01F 23/76

(52) U.S. Cl. .................. 73/305; 73/307; 73/321; 73/322; 73/322.5; 73/290 R (58) Field of Search .............................. 73/305, 307, 321, 73/322, 322.5

(56) References Cited

U.S. PATENT DOCUMENTS

| | | |
|---|---|---|
| 2,771,774 | 11/1956 | Fornasieri . |
| 2,772,568 | 12/1956 | Samaritano . |
| 2,807,960 * | 10/1957 | Schweitzer ............................. 73/322 |
| 2,868,016 * | 1/1959 | Steed .................................... 73/322 |
| 3,217,541 | 11/1965 | Williamson . |
| 3,283,578 | 11/1966 | Moore . |
| 3,359,799 | 12/1967 | Lubin . |
| 3,440,880 | 4/1969 | Hoyer . |
| 3,498,141 | 3/1970 | Nelson et al. . |
| 3,555,905 | 1/1971 | George . |
| 3,691,839 | 9/1972 | Lasher . |
| 4,019,659 * | 4/1977 | Deneen ................................. 73/322 |
| 4,116,062 | 9/1978 | Reip . |
| 4,819,484 | 4/1989 | White . |
| 5,020,367 | 6/1991 | White . |
| 6,028,521 * | 2/2000 | Issachar ............................... 340/624 |

* cited by examiner

Primary Examiner—Hezron Williams
Assistant Examiner—Dennis Loo
(74) Attorney, Agent, or Firm—Woodard, Emhardt, Naughton, Moriarty & McNett (57) ABSTRACT

Apparatus and method are provided for indicating the amount of liquid contained in a railroad tank car, or any other liquid storage tank having an interior surface defining a liquid level reference point. A readily portable liquid level indicator gauge is provided having a tube defining an opening extending along its length, and an elongate rod slidably received therein. A buoyant member is attached to the rod to cause the rod to be vertically displaced in response to the vertical displacement of the buoyant member resulting from a corresponding change in liquid level. A reference arm is connected to the tube and a portion thereof forms an abutting relationship with an interior surface of the tank at the liquid level reference point. A clamping device connected to the tube is adapted to releasably attach the portable gauge to the tank in a substantially vertical orientation. A surface of the rod has sequential indicia markings applied thereon which are readable in reference to a portion of the tube to indicate the amount of liquid contained in the tank, with the indicia markings corresponding to the level of liquid in the tank relative to the liquid level reference point.

36 Claims, 6 Drawing Sheets fig. 1 fig. 4 fig. 5 fig. 6 fig. 7 fig. 8

1

PORTABLE CLAMP-ON LIQUID LEVEL INDICATOR GAUGE

BACKGROUND OF THE INVENTION

1. Field of the Invention

This invention relates generally to a liquid level indicator gauge, and more particularly to a portable gauge which can be conveniently and easily clamped onto a liquid storage tank for accurately determining the amount of liquid contained therein.

2. Description of the Prior Art

Liquid storage tanks are used to contain various substances in a wide range of applications. It is usually of interest, and often a necessity, to determine the level of liquid in a storage tank. Many approaches have been developed for determining liquid level. In most instances, the liquid level gauge is permanently installed on the storage tank. However, it is relatively expensive to provide a liquid level gauge in each storage tank when liquid level must be monitored in a plurality of such tanks. Furthermore, most liquid level gauges are not suitable for use as a portable device because of their intricate design, electrical connections, excessive weight, or bulkiness. Such gauges cannot be readily transported from one tank to another without undue risk of damage to the internal workings or delicate, external features of the device.

In some cases, rudimentary means are sufficient to determine liquid level, such as the insertion of a measuring rod or dip stick through an opening in the top of the storage tank. The measuring rod is typically graduated, with markings along its length which are indicative of the level of liquid contained in the tank. One end of the rod is initially placed in abutment against the bottom of the storage tank and the rod is then withdrawn. The liquid level is apprised by simply observing how much of the rod is wetted relative to the liquid level markings. However, various problems arise through the use of such a method to measure liquid depth. For example, certain volatile liquids, such as gasoline, tend to evaporate quickly so that the wetted portion of the rod may not be readily observable, especially in poor light. On the other hand, viscous liquids, such as diesel fuel or crude oil, are stable but are not easily wiped or removed from the measuring rod. Moreover, an accurate liquid level measurement is only possible if the measuring rod is manually aligned in a substantially vertical orientation.

More refined approaches for determining liquid level in a storage tank have been developed which utilize portable measuring devices. Such devices are disclosed in U.S. Pat. No. 3,691,839 to Lasher, and U.S. Pat. No. 4,819,484 to White. Although these devices are transportable, they do not have features which allow them to be easily and securely attached to the storage tank. Moreover, the liquid level reference point for these particular devices is the exterior top surface and interior bottom surface of the storage tank, respectively. However, in certain storage tank applications, such as a railroad tank car, the liquid level reference point is typically the interior top surface of the tank car.

The present invention attempts to remedy the problems and drawbacks of prior liquid level gauges, and provides a portable liquid level indicator gauge which easily and securely clamps onto a railroad tank car to accurately determine the amount of liquid contained therein relative to a predetermined liquid level reference point.

SUMMARY OF THE INVENTION

The present invention generally relates to a portable liquid level indicator gauge for easily and accurately determining the amount of liquid contained in a storage tank. While the nature of the invention covered herein is to be determined with reference to the claims appended hereto, certain forms of the invention that are characteristic of the preferred embodiment are described briefly as follows.

An apparatus and method are provided for indicating the amount of liquid contained in a tank having an interior surface defining a liquid level reference point. According to a typical embodiment, the gauge includes an elongate rod for indicating liquid level in the tank and a buoyant member operably connected to the rod to cause the rod to be vertically displaced in response to the vertical displacement of the buoyant member resulting from a corresponding change in liquid level. A guide defining a longitudinal axis slidably receives the rod and guides the rod generally in a longitudinal direction. A reference arm is operably connected to the guide and forms an abutting relationship with the interior surface of the tank at the liquid level reference point. In a further aspect of the invention, the portion of the reference arm forming the abutting relationship with the interior surface of the tank is located at a predetermined distance from a reference point on the guide.

It is an object of the present invention to provide an apparatus and method for accurately determining the amount of liquid contained in a storage tank relative to a predetermined liquid level reference point.

Another object of the present invention is to provide an easily and readily portable liquid level indicator gauge which is releasably attached to a portion of the storage tank. Additional objects, features, and advantages of the present invention will be apparent to those skilled in the art upon consideration of the following detailed description of a preferred embodiment exemplifying the best mode of carrying out the invention as presently perceived.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is hereby intended, any alterations and further modifications in the illustrated device, and any further applications of the principles of the invention as illustrated therein being contemplated as would normally occur to one skilled in the art to which the invention relates.

Figure 1:
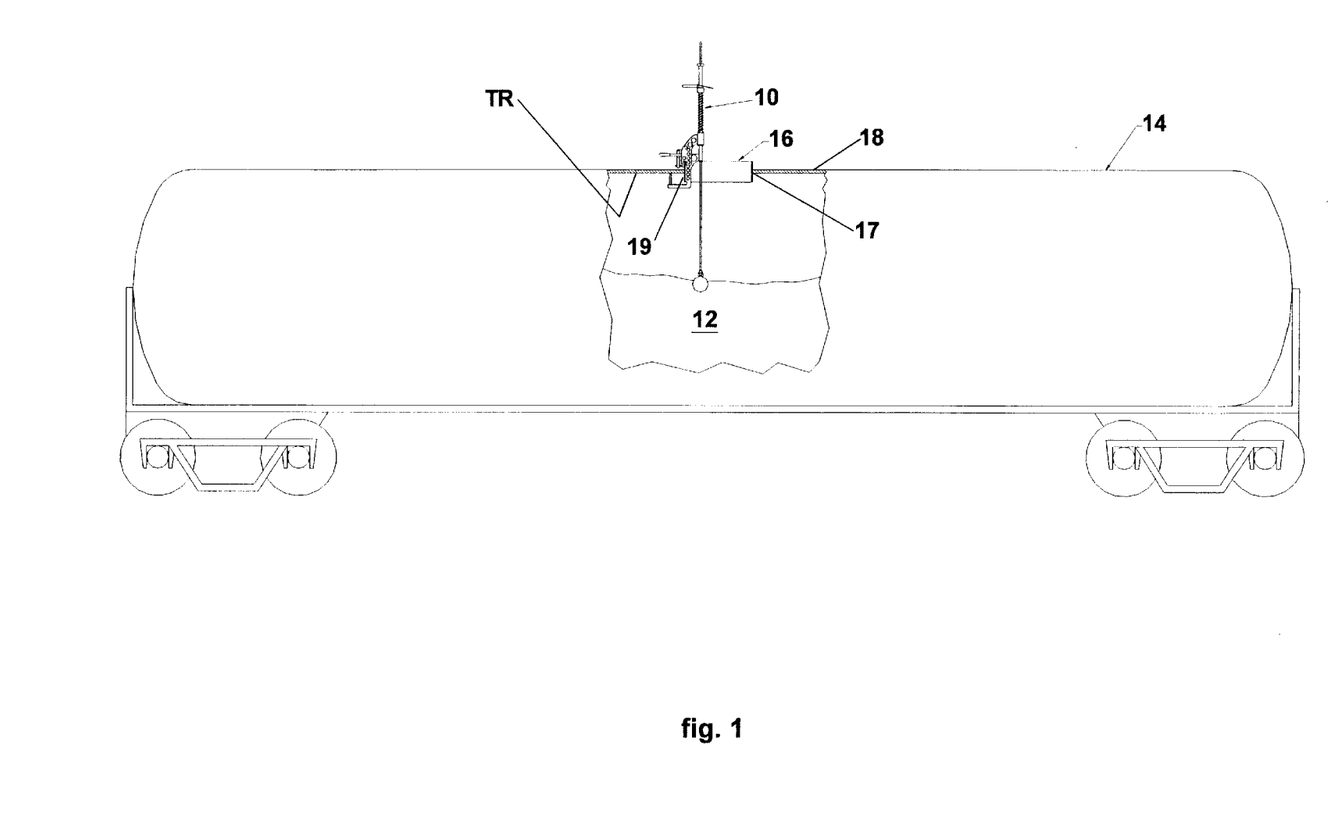
FIG. 1 is a side elevation view of a portable liquid level gauge according to one embodiment of the present invention, as used in conjunction with a railroad tank car.

Referring now to the drawings in detail, FIG. 1 illustrates a portable gauge 10 for indicating the amount of liquid 12 contained in a railroad tank car 14. The level of liquid 12 is measured relative to liquid level reference point TR, which is defined at the uppermost interior surface of tank car 14. Tank car 14 has a substantially cylindrical configuration and access to the interior of the tank can be made through access hatch 16. Access hatch 16 is formed by an access opening 17, extending through tank wall 18 and circumscribing a cylindrical collar 19. Collar 19 is permanently connected to tank wall 18 in a substantially vertical orientation, preferably by welding. To measure the amount of liquid 12 contained in tank car 14, gauge 10 is shown releasably attached to access hatch 16. To ensure the accurate measurement of liquid level, gauge 10 is placed in a predetermined vertical position relative to liquid level reference point TR and is aligned in a substantial vertical orientation.

It should be understood that the exact configuration of tank car 14 may vary. For instance, it is well known that tank cars can be configured to take on a variety of hatch or port arrangements. The tank sections can also be fabricated in a wide variety of sizes and configurations, and need not necessarily be cylindrical. It should also be understood that, although the liquid level reference point TR is located at the uppermost interior surface of tank car 14, reference point TR may be located elsewhere on tank car 14.

Figures 2, 3:
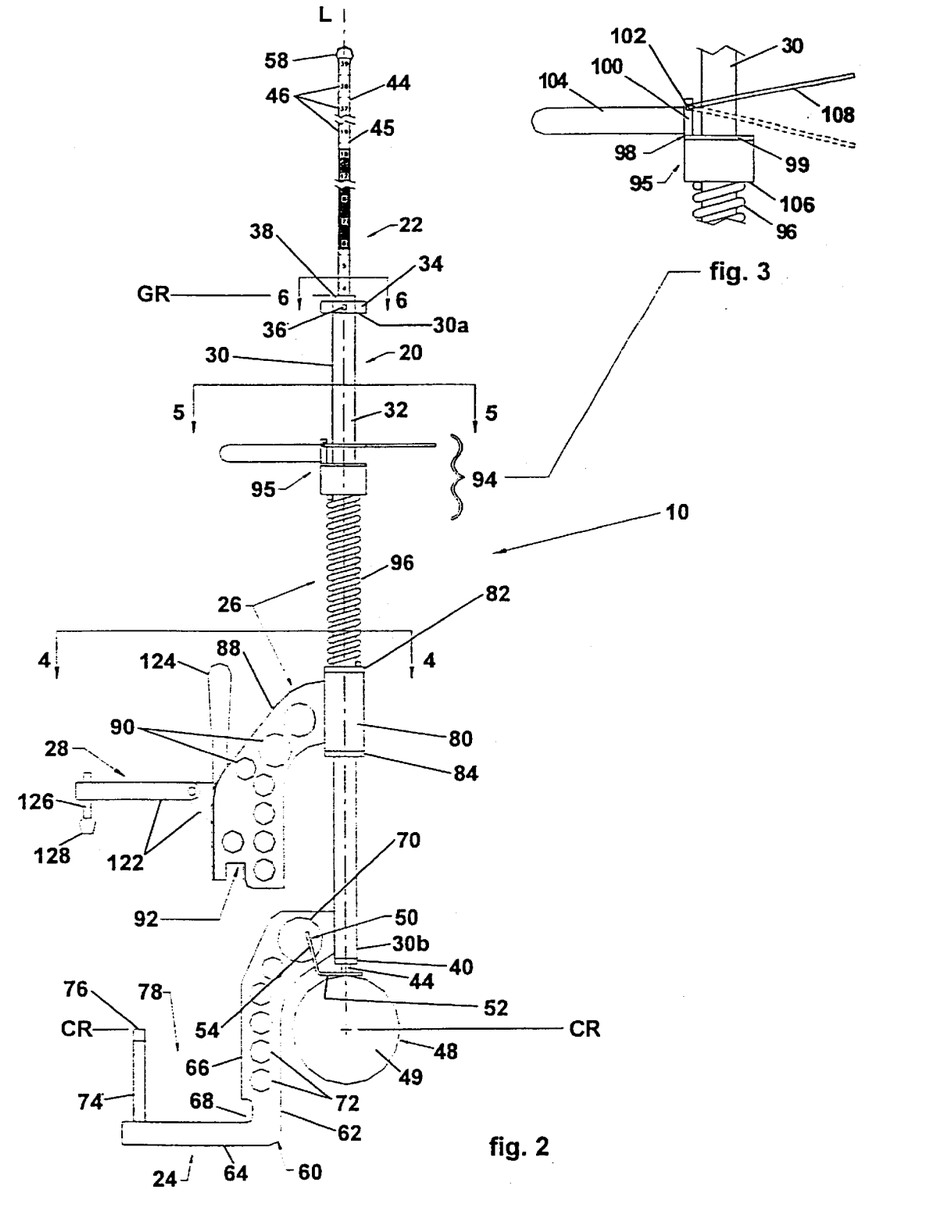
FIG. 2 is a side elevation view of the gauge depicted in FIG. 1, as shown in a preinstallation configuration.
FIG. 3 is an enlarged side view of an upper clamp assembly for use with the gauge depicted in FIG. 2.

Referring now to FIG. 2, shown therein is an enlarged view of portable gauge 10 in a pre-installation configuration. Gauge 10 generally includes a guide device 20, a rod assembly 22, a reference arm assembly 24, a vertical clamping device 26, and a pivotal clamping device 28.

Figure 4:
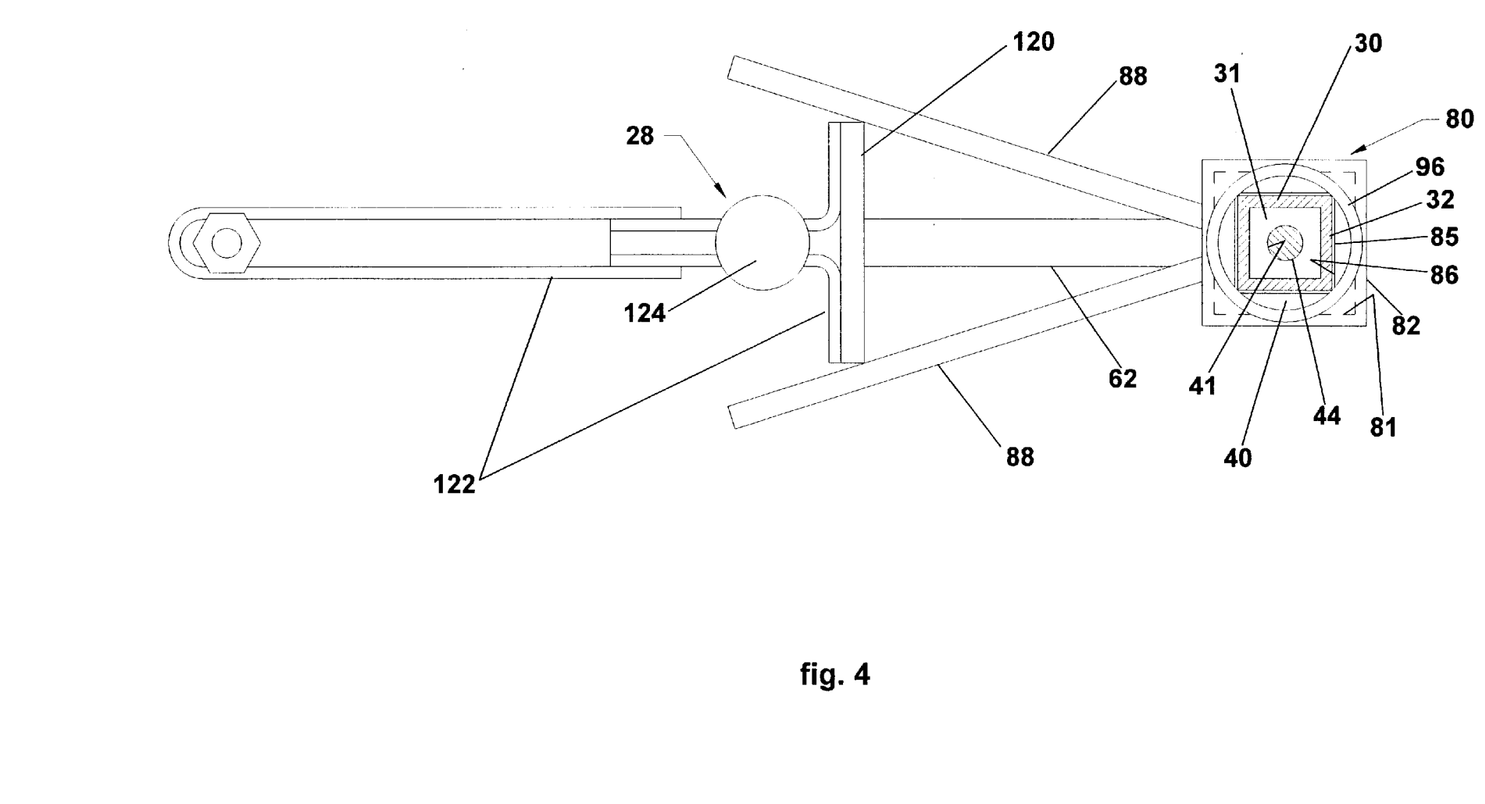
FIG. 4 is a top cross-sectional view of the gauge depicted in FIG. 2, taken along line 4—4 of FIG. 2.
Figure 5:
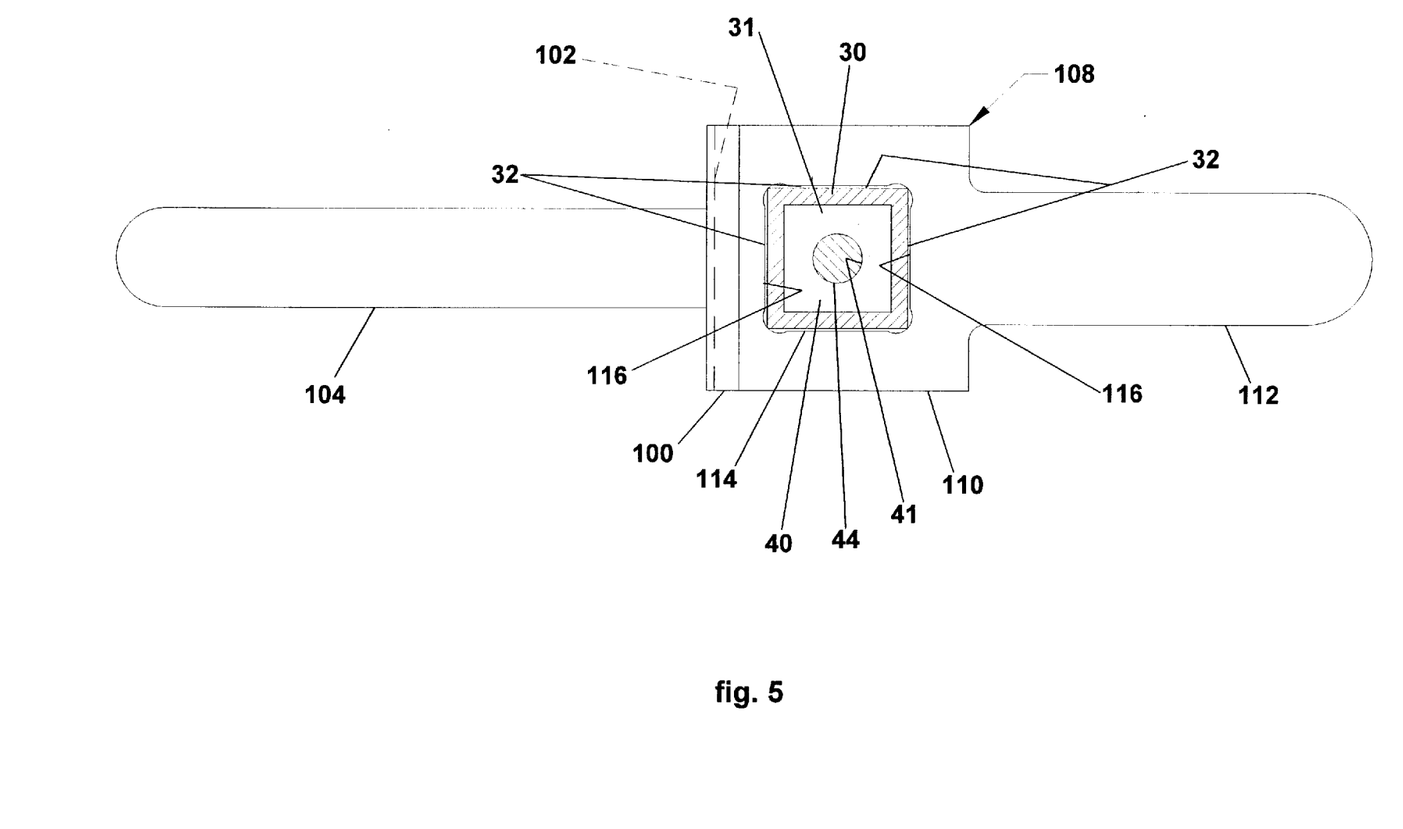
FIG. 5 is a top cross-sectional view of the gauge depicted in FIG. 2, taken along line 5—5 of FIG. 2.
Figures 6, 7:
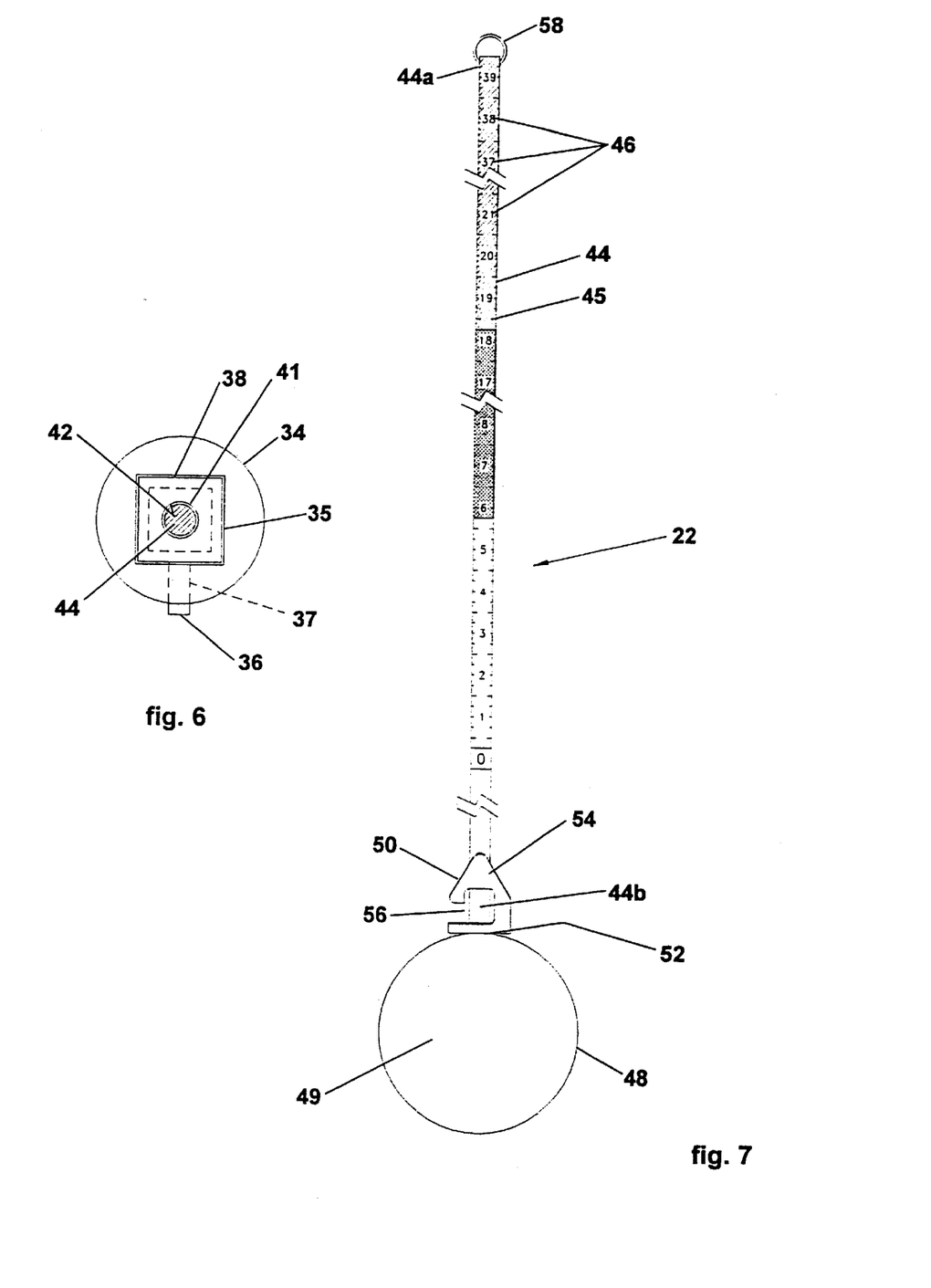
FIG. 6 is a top cross-sectional view of the gauge depicted in FIG. 2, taken along line 6—6 of FIG. 2.
FIG. 7 is an enlarged side view of a rod assembly for use with the gauge depicted in FIG. 2.

Guide device 20 includes an elongate tube 30 defining a longitudinal axis L and opposing ends 30a, 30b. Tube 30 has an opening 31 extending therethrough in a longitudinal direction (FIGS. 4 and 5). In the illustrated embodiment, tube 30 has a square cross section and defines generally flat exterior surfaces 32. However, it should be understood that tube 30 can take on other cross sections as well, such as, for example, a circular or polygonal configuration. A retaining collar 34 is attached to tube 30. As most clearly shown in FIG. 6, retaining collar 34 defines a square opening 35 extending therethrough, sized slightly larger than the outer cross-section of tube 30. Thereby, collar 34 is receivable along the length of tube 30 on exterior surfaces 32. Collar 34 includes a threaded aperture 37 for receiving a set screw 36. The set screw 36 is engageable with tube 30 to lock collar 34 in a selected longitudinal position relative to tube 30, preferably adjacent upper end 30a. Guide device 20 additionally includes a pair of guide plates 38, 40, attached to opposing ends 30a, 30b of tube 30. Preferably, guide plates 38, 40 have the same outer cross-section as the outer cross-section of tube 30, and may be attached to tube 30 by any means known to one of ordinary skill in the art, such as, for example, by a fastener, an adhesive, or by compression fit. Referring to FIG. 6, each of plates 38, 40 has a generally circular opening 41 extending therethrough, thus defining an inner guiding surface 42. Preferably, but not necessarily, guide plates 38, 40 are composed of a material having a relatively low coefficient of friction, such as, for example, Teflon®. Although the illustrated embodiment of guide device 20 depicts the use of a pair of guide plates 38, 40 disposed at opposite ends 30a, 30b of tube 30, it should be understood that the number and location of the guide plates may be varied.

Rod assembly 22, as most clearly illustrated in FIG. 7, includes an elongate rod 44 having a top end 44a and a bottom end 44b. Imprinted or applied to a longitudinal surface 45 of rod 44 are indicia markings 46 corresponding to the amount of liquid 12 contained in tank car 14 at various liquid levels. Preferably, the indicia markings 46 constitute horizontal lines accompanied by sequential numeric values corresponding to liquid volume or liquid depth. In a preferred embodiment, the indicia markings 46 correspond to the level of liquid 12 in tank car 14 relative to liquid level reference point TR. In operation, the amount of liquid 12 contained in tank car 14 may be readily determined by directly observing which indicia marking 46 is alignable with a predetermined reference plane as rod 44 is vertically displaced generally along longitudinal axis L. Preferably, the predetermined reference plane is the top surface GR (FIG. 2) of upper guide plate 38.

In addition to indicia markings 46, the surface 45 of rod 44 preferably has a varying background color (not shown) along its observable length to signify a general range of liquid volume or liquid depth. For example, in one embodiment, approximately the uppermost 27 inches of rod 44 has a green background color, corresponding to an empty or partially empty tank condition. Approximately the next 7 inches of rod 44 has a yellow background color, corresponding to a cautionary liquid volume or depth. The lowermost 6 inches of the observable length of rod 44 has a red background color, corresponding to a near full or full tank condition. Thus, a general indication of liquid volume or liquid depth may be readily determined by directly observing which background color of rod 44 is alignable with a predetermined reference plane, preferably the top surface of upper guide plate 38. In operation, if a tankerman is not able to read indicia markings 46 from a remote location, the tankerman may observe the background color of rod 44 to gain a general understanding of the amount of liquid 12 contained in tank car 14.

A buoyant member or float 48 is attached to lower end 44b of rod 44. Float 48 is generally ball-shaped and includes a hollow, generally spherical shell 49. Spherical shell 49 defines an inner air chamber isolated from the liquid 12 so as to provide buoyancy. Thus, as float 48 rises or falls in response to a change in liquid level, rod 44 will correspondingly be vertically displaced. Also attached to bottom end 44b of rod 44, adjacent float 48, is a retaining hook 50, the function of which will become apparent below. Retaining hook 50 includes a generally flat base 52 and an arm 54 extending therefrom in an angular orientation (FIG. 2). Arm 54 defines a notched opening 56 so as to define a laterally and downwardly-opening hook configuration. It will be understood from the subsequent discussion that retaining hook 50 may be fixed to the rod elsewhere along the length of rod 44, or can be attached directly to float 48.

Rod assembly 22 is operably assembled with guide device 20 by inserting rod 44 through the opening 41 (FIGS. 4 and 5) in lower guide plate 40, through longitudinal opening 31 of tube 30, and through opening 41 of upper guide plate 38 (FIG. 6). Openings 41 in guide plates 38, 40 are aligned generally along longitudinal axis L of tube 30 and are sized slightly larger than the outer diameter of rod 44. Thus, as float 48 is vertically displaced in response to a change in liquid level, rod 44 will be correspondingly displaced along longitudinal axis L. Attached to upper end 44a of rod 44 is a ring 58, one function of which is to aid in the manual displacement of rod 44. Another function of ring 58 is to prevent the rod assembly 22 from accidentally falling out of guide device 20. While the rod may be a solid shaft or hollow tube, it is preferable that it be solid, or that if a tube, it be closed at both ends to minimize or avoid any change in weight or resistance to flotation while in use.

Figure 8:
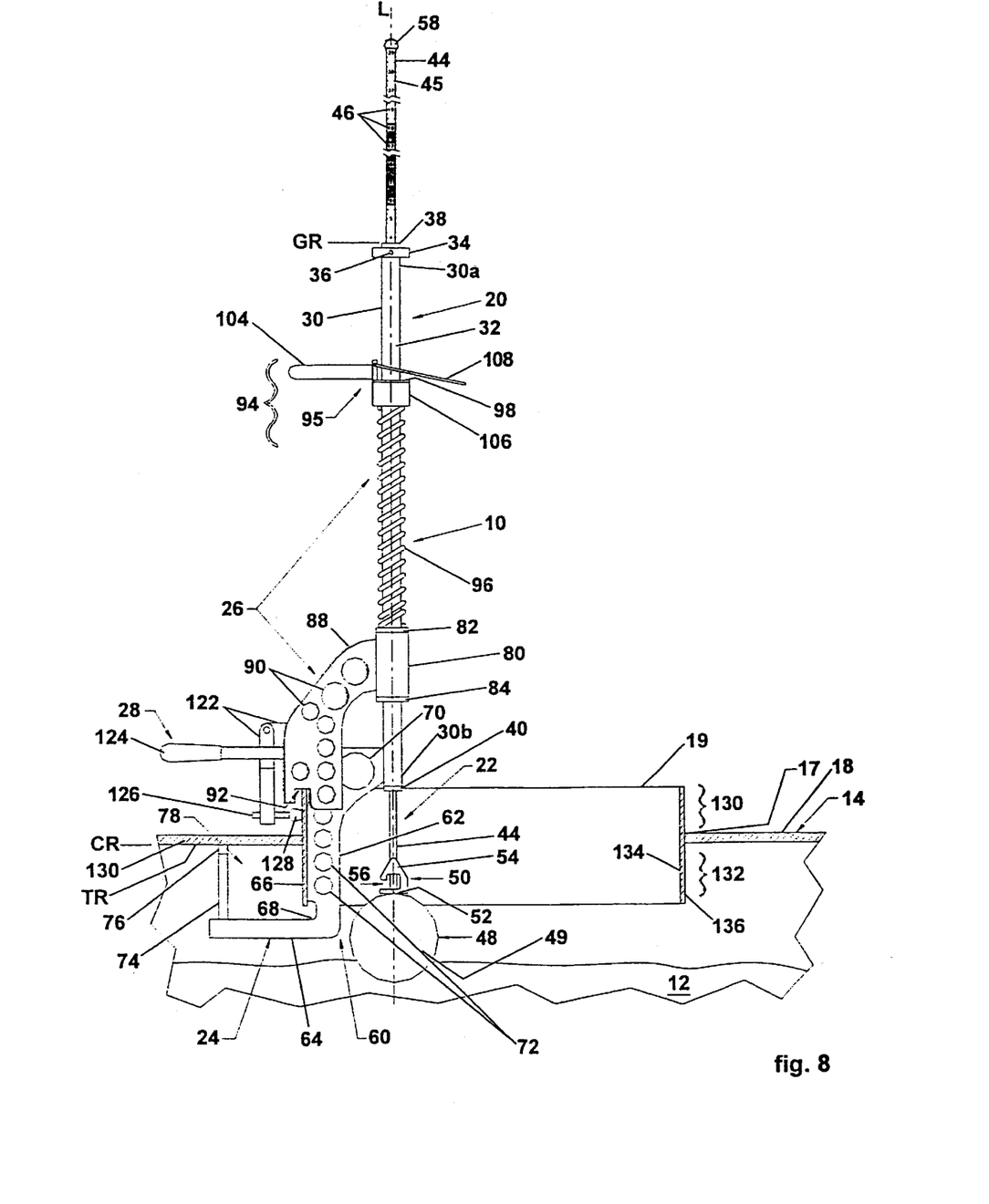
FIG. 8 is a side elevation view of the gauge depicted in FIG. 2, as shown in an installed configuration on a fragmentary portion of a railroad tank car.

Referring again to FIG. 2, a reference arm assembly 24 is connected to an exterior surface 32 of tube 30. Reference arm assembly 24 includes an L-shaped base member 60 having a vertical leg 62 and a horizontal base 64. Vertical leg 62 is fixed to tube 30, preferably by welding, and defines a generally straight surface 66 facing away from tube 30 and extending parallel to longitudinal axis L. Vertical leg 62 also defines a horizontal notch or recess 68 in the transitional region between vertical leg 62 and horizontal base 64. Vertical leg 62 additionally defines a horizontal opening 70 extending therethrough and sized to receive retaining hook 50 of rod assembly 22. Additional openings 72 are disposed along the length of vertical leg 62, one purpose of which is to reduce the overall weight of gauge 10. Preferably, vertical leg 62 is integral with horizontal base 64 to define a monolithic structure. A vertical extension leg 74, aligned parallel to longitudinal axis L, extends upwardly from horizontal base 64. Extension leg 74 has a tip 76 attached to its end. Preferably, tip 76 is made of Teflon®. Base member 60 and vertical extension leg 74 thus cooperate to form a substantially U-shaped channel 78. The length of extension leg 74 is such that when tip 76 is placed in abutment against an interior top surface of tank wall 18, guide device 20 will correspondingly be placed at a predetermined vertical height relative to liquid level reference point TR (FIGS. 1 and 8). In one example, extension leg 74 is approximately 4 inches in length to provide ample clearance when collar 132 is received in U-shaped channel 78 (FIG. 8) during gauge placement.

Vertical clamping device 26 includes a guide sleeve 80 having an opening 81 (FIG. 4) extending therethrough. In this illustrated embodiment, guide sleeve 80 is a tube having a square cross-section. However, it should be understood that guide sleeve 80 can take on other cross-sections as well, such as, for example, a circular or polygonal configuration. A pair of guide plates 82, 84 is attached to opposite ends of guide sleeve 80. Preferably, guide plates 82, 84 have the same outer cross-section as the outer cross-section of guide sleeve 80, and may be attached to guide sleeve 80 by any means known to one of ordinary skill in the art, such as, for example, by a fastener, an adhesive, or by compression fit. Referring to FIG. 4, each of plates 82, 84 has a generally square opening 85 extending therethrough. Openings 85 are sized slightly larger than the outer cross-section of tube 30, thus defining inner guiding surfaces 86 for tube 30. Preferably, but not necessarily, guide plates 82, 84 are composed of a material having a relatively low coefficient of friction, such as, for example, Teflon®. Although the illustrated embodiment depicts the use of a pair of guide plates disposed at opposite ends of guide sleeve 80, it should be understood that the number and location of the guide plates may be varied. Openings 85 in guide plates 82, 84 are aligned so as to permit guide sleeve 80 to freely slide along the length of tube 30, generally along longitudinal axis L.

Connected to guide sleeve 80, preferably by welding, is a pair of clamp mount plates 88, aligned in a substantially vertical orientation and angularly disposed relative to one another (FIG. 4). Holes 90 are defined at various locations through clamp mount plates 88, one purpose of which is to reduce the overall weight of gauge 10. Each of clamp mount plates 88 also defines a downwardly-opening vertical notch 92 extending upwardly from a bottom edge of the plate. Vertical notch 92 is sized to receive the upper edge of collar 19 of access hatch 16 therein.

Vertical clamping device 26 also includes a biasing device 94, comprising a locking member 95 and a spring 96. Locking member 95 is configured to slide along the length of tube 30, generally along longitudinal axis L. Spring 96 is disposed about tube 30 and is positioned between locking member 95 and upper guide plate 82 of guide sleeve 80. Preferably, spring 96 is a coil spring.

Referring to FIG. 3, locking member 95 includes an L-shaped support bracket 98 having a horizontal base 99 and a vertical leg 100 extending therefrom. Base 99 defines a generally square opening therethrough (not shown), sized slightly larger than the outer cross-section of tube 30. An upper portion of vertical leg 100 defines a horizontal notch 102. A bar handle 104 is fixed to vertical leg 100, extending therefrom in a generally horizontal direction. One purpose of handle 104 is to manually displace locking member 95 along tube 30.

Locking member 95 also includes a guide block 106 defining a generally square opening therethrough (not shown), of the same shape and sized slightly larger than the outer cross-section of tube 30. Base 99 of support bracket 98 is connected to guide block 106, preferably by way of a plurality of fasteners. Thus, while block 106 is slidably and guidedly received on tube 30, block 106 maintains the correct attitude of bracket 98 relative to tube 30 during sliding of locking member 95 generally along longitudinal axis L. Preferably, but not necessarily, guide block 106 is composed of a material having a relatively low coefficient of friction, such as, for example, Delrin® or Teflon®.

Referring to FIG. 5, locking member 95 additionally includes a key-shaped lever 108 having a base portion 110 and an elongate portion 112 extending therefrom. Base portion 110 defines a generally square opening 114 extending therethrough, and sized slightly larger than the outer cross-section of tube 30. Opening 114 is partially bounded by a pair of oppositely disposed inner locking edges 116. The end of base portion 110 is disposed within horizontal notch 102 of vertical leg 100, and tube 30 is slidably received within opening 114 such that, when lever 108 is in a substantially horizontal position, locking member 95 will be in an unlocked configuration. In this unlocked configuration, locking member 95 is permitted to freely slide along the length of tube 30. However, when lever 108 is pivoted downwardly (clockwise) relative to horizontal notch 102, at least one of locking edges 116 will become tightly engaged against an exterior surface 32 of tube 30, thereby placing locking member 95 in a locked configuration (shown in phantom in FIG. 3) in this locked configuration, locking member 95 is interlocked with tube 30 in a selected position along longitudinal axis L, and will no longer be permitted to freely slide along the length of tube 30.

Referring to FIGS. 2 and 4, pivotal clamping device 28 is mounted to vertical mounting plate 120, which in turn is disposed between and fixed to clamp mount plates 88, preferably by welding. Pivotal clamping device 28 is shown schematically in the drawings herein, as it can be purchased off-the-shelf. It is a toggle-type clamp which includes a pivoting link and lever assembly 122 securely attached to mounting plate 120, preferably by way of a plurality of fasteners (not shown). A handle portion 124 is pivotally connected to the clamp arm portion of assembly 122, and a threaded stem 126 extends from the clamp arm of assembly 122, perpendicular to the arm. Threaded stem 126 is received within a threaded aperture (not shown) in the clamp arm 122 so as to provide adjustable positioning of stem 126. Disposed at an end of stem 126 is a tip 128, preferably made of rubber. An example of a suitable pitoval clamping device 28 is a hold-down clamp manufactured by De-Sta-Co Industries of Birmingham, MI, U.S.A. under Part No. 210-U. However, other suitable pivotal clamping devices are also contemplated as would occur to one of ordinary skill in the art.

In operation, gauge 10 has a pre-installation configuration, as shown in FIG. 2, and an installed configuration, as shown in FIG. 8. In the configuration depicted in FIG. 2, rod assembly 22 is shown retained in a predetermined longitudinal stored position relative to tube 30. Rod assembly 22 is selectively attached to reference arm assembly 24 by inserting retaining hook 50 (which is fixed to rod assembly 22) through opening 70 in vertical leg 62. The selective retention of rod assembly 22 allows for gauge 10 to be easily and conveniently transported from one tank to another without risk of damage to rod 44 or float 48. While gripping tube 30, rod assembly 22 may be released from reference arm assembly 24 by lifting rod assembly 22 until opening 56 in retaining hook 50 is clear of opening 70 in vertical leg 62. Rod assembly 22 is then rotated in a counter-clockwise direction (viewed from the top), until retaining hook 50 is clear of reference arm assembly 24, thereby allowing rod 44 to slide freely within guide device 20 along longitudinal axis L.

As also depicted in FIG. 2, vertical clamping device 26 is shown in a pre-installation configuration. In this operational configuration, locking member 95 is shown in an unlocked configuration in which lever 108 is placed in a substantially perpendicular relationship relative to longitudinal axis L. In its unlocked configuration, locking member 95 is permitted to slide along the length of tube 30. Additionally, when locking member 95 is in its unlocked configuration, spring 96 and guide sleeve 80 with clamp mount plates 88 thereon, are correspondingly permitted to be displaced along the length of tube 30. However, retaining collar 34 serves to prevent vertical clamping device 26 from sliding completely off the upper end of tube 30. Pivotal clamping device 28 is also shown in a pre-installation configuration. The clamp arm thereof is placed in a pivotal position in which stem 126 is generally parallel with longitudinal axis L.

When in its pre-installation configuration (FIG. 2), gauge 10 may be inserted in tank car 14 via access hatch 16. As most clearly shown in FIG. 8, cylindrical collar 19 of access hatch 16 includes an exterior portion 130 extending outwardly from tank wall 18, and an interior portion 132 extending inwardly from tank wall 18. Additionally, collar 19 defines a substantially vertical inner surface 134 and a substantially vertical outer surface 136. The lower portion of gauge 10 is inserted through access hatch 16, far enough so that the tip 76 of vertical extension leg 74 of reference arm assembly 24 is positioned below the level of the lower edge of the interior portion 132 of collar 19. Then, the assembly is moved sideways and then up, so that interior portion 132 is received within U-shaped channel 78 of reference arm assembly 24. Tip 76 is placed in abutment against an interior surface of tank wall 18, which is designated as liquid level reference point TR. Additionally, straight surface 66 of vertical leg 62 is placed in abutment against inner surface 134 of collar 19, thus ensuring the desired vertical alignment of gauge 10.

Then, while gripping tube 30 with one hand to keep tip 76 in abutment against tank wall 18, vertical clamping device 26 is downwardly displaced by applying a downward force to handle 104 with the other hand (or foot), until a portion of exterior portion 130 of collar 19 is positioned within and abuts the top of the downwardly-opening vertical notch 92 of clamp mount plates 88. The downward displacement of locking member 95 exerts a downward vertical force on spring 96, which in turn exerts a downward force on upper guide plate 82 of guide sleeve 80. The downward spring force exerted on guide sleeve 80 causes the notches in clamp mounting plates 88 to tightly engage the upper edge of exterior portion 130 of collar 19 in an abutting relationship, which in turn causes tip 76 of reference arm assembly 24 to remain in constant abutment against the interior surface of tank car 14 at liquid level reference point TR. Locking member 95 may then be placed in its locked configuration by pushing, and thereby pivoting, lever 108 downward in a clockwise direction relative to horizontal notch 102 of vertical leg 100, thereby engaging one or both of the locking edges 116 with the tube 30. Member 95 is thereby locked to tube 30, securely attaching gauge 10 to tank car 14. The spring 96, now in a compressed state, urges tube 30 upwardly, consequently urging the reference arm tip 76 upwardly. Tip 76 is thereby reliably maintained in an abutting relationship with tank wall 18 at liquid level reference point TR.

After vertical clamping device 26 has been placed in its installed configuration, pivotal clamping device 28 may then be repositioned from its FIG. 2 pre-installation position in which tip 128 is positioned remote from outer surface 136 of collar 19, to its FIG. 8 installation position in which tip 128 is placed in tight engagement against collar outer surface 136. In this installation position, pivotal clamping device 28 further secures gauge 10 in position relative to tank car 14. Although pivotal clamping device 28 has been illustrated and described as a secondary means for securing gauge 10 to tank car 14, it should be understood that pivotal clamping device 28 may be used alone to releasably attach gauge 10 to tank car 14.

After gauge 10 has been securely attached to tank car 14, rod assembly 22 is released from reference arm assembly 24 (via the lift, turn and lower procedure described above), thereby allowing rod assembly 22 to freely descend within tube 30, along longitudinal axis L, until float 48 is buoyantly supported by liquid 12. With tube 30 aligned in a substantially vertical orientation, and securely positioned in a predetermined longitudinal position relative to liquid level reference point TR, the fluid contents of tank car 14 can be readily determined by directly observing which indicia marking 46 aligns with the top surface of upper guide plate 38. As liquid 12 is added or removed from tank car 14, rod assembly 22 will be vertically displaced in response to a corresponding change in liquid level. Again, the amount of liquid 12 contained in tank car 14 can be instantaneously determined by directly reading indicia markings 46. Also, as described above, a general indication of liquid content can be readily determined by observing which background color of rod 44 aligns with the upper surface of upper guide plate 38.

When the use of the gauge assembly is no longer required, it can be removed easily from tank car 14. The rod assembly 22 is raised and hooked in its retained position by once again engaging retaining hook 50 within opening 70. Pivotal clamping device 28 is then unclamped by pivoting clamp arm 122 until pivotal clamping device 28 is in its pre-installation configuration. Locking plate 108 is then manually released, decompressing spring 96 and allowing tube 30 and reference tip 76 to be lowered to clear interior portion 132 of collar 19. Then, the clamp mount plates 88 are lifted from the upper edge portion of collar 19 and gauge 10 is moved toward the center of access hatch 16. Gauge 10, now in its pre-installation configuration, may be removed from tank car 14 and transported to another tank car for further measurements. It should thus be appreciated that gauge 10 may be quickly and easily utilized in determining the amount of liquid contained in a storage tank, obviates the hazards of contaminating the liquid contained therein, and provides a positive and accurate determination of liquid level relative to a predetermined liquid level reference point. It should also be appreciated that gauge 10 is lightweight and compact for easy and convenient transport from one tank car to another.

Referring to FIGS. 2 and 8, it should be understood that the distance between the top plane CR of tip 76 and the top plane GR of upper guide plate 38 be known, so that when tip 76 abuts a downwardly facing liquid level reference surface in tank car 14 (TR in the present illustration) the height relationship of TR to GR (i.e., tank to gauge) is known. Rod 45 can then be calibrated so that sequential indicia markings 46 can be placed thereon, corresponding to the amount of liquid contained in tank car 14. Indicia markings 46 are readable in reference to top plane GR of upper guide plate 38, as in the illustrated embodiment, or some alternative location on gauge 10 that is fixed relative to tip 76.

In the illustrated embodiment of gauge 10, if tank car 14 is considered "full" when the float 48 is at its pre-installation position, the float will actually be floating within the collar 19, and the rod indicia marking 46 at plane GR could be designated as "8 FT" if the tank is eight feet deep. Alternatively, the marking could be designated as "full" or "F" or "100%", depending on the desire of the user or custom in the industry. Also, since a tank having inwardly curved top walls fills more quickly as the level rises near the top, it may be desirable to use indicia indicating a full or maximum level condition when the float is somewhat below the liquid level reference point TR. Also, if the specific tank hatch arrangement makes it inconvenient to access the inside surface of tank wall 18 at reference point TR, some other downwardly facing surface or edge may alternatively be designated as reference point TR. Additionally, a different location on gauge 10 may be used to form the abutting relationship with a surface of tank car 14, such as the top surface of horizontal base 64 of reference arm 24 if, for example, the abutting relationship is to be formed with the lower edge of collar 19. In this instance, the top surface of base 64 and the lower edge of the collar 19 would be designated as the TR reference point.

If it is desired to use gauge 10 of the present invention to indicate the volume of liquid contained in tank car 14, it would be appropriate to calibrate the indicia markings 46 by spacing them according to the actual volume of liquid contained in the tank at corresponding liquid levels, it being understood that such calibration would be directly dependent on the shape and configuration of the tank. Also, of course, if the specific gravity of the liquid is varied, the calibration of indicia markings 46 could be changed accordingly to compensate for the variation in liquid buoyancy.

While the invention has been illustrated and described in detail in the drawings and foregoing description as applied to a railroad tank car, it should be understood that the invention can alternatively be applied in a variety of other mobile situations, such as, for example, tanker trucks and tank barges. The invention could alternatively be used in stationary environments/sites as well, including any type of liquid storage tank or container, to accurately determine the amount of liquid contained therein. The disclosure is therefore to be considered as illustrative and not restricted in character, it being understood that only the preferred embodiment has been shown and described, and that all changes and modifications that come within the spirit of the invention are desired to be protected.

What is claimed is:

1. A portable gauge for determining the amount of liquid contained in a tank having an interior surface defining a liquid level reference point, the gauge comprising:

an elongate rod for indicating the amount of liquid contained in the tank;

a buoyant member operably coupled to said rod to cause said rod to be displaced in response to corresponding displacement of said buoyant member resulting from a change in liquid level;

a guide device adapted to guide said rod during displacement of said rod; and a reference arm operably coupled to said guide device, a portion of said reference arm forming an abutting relationship with said interior surface of said tank at said liquid level reference point.

2. The gauge of claim 1 and wherein:

said tank includes a collar defining an access opening, said collar extending inwardly from said interior surface of said tank;

said reference arm is configured to form a channel for receiving at least a portion of said collar therein; and one end of said reference arm is operably coupled to said guide device and the other end of said reference arm defines said portion which forms said abutting relationship with said interior surface of said tank.

3. The gauge of claim 1 and further comprising:

a clamping device operably coupled to said gauge and adapted to releasably attach said gauge to said tank.

4. The gauge of claim 3 and wherein:

said tank includes a collar defining an access opening, said collar extending outwardly from said tank, said clamping device having one operational configuration permitting said gauge to be at least partially inserted through said access opening and into said tank, and another operational configuration in which said clamping device engages said collar to releasably attach said gauge to said tank.

5. The gauge of claim 1 and wherein:

said guide device comprises an elongate tube, defining a guiding surface adapted to guide said rod during displacement of said rod relative to said guide device.

6. The gauge of claim 3 and wherein:

said clamping device comprises a clamp member adapted to slide along said guide device, and a biasing member for exerting a force onto said clamp member to engage said clamp member in an abutting relationship with a portion of said tank to releasably attach said gauge to said tank.

7. The gauge of claim 6 and wherein:

said clamping device further comprises a pivotal clamp pivotable between a first position remote from a substantially vertical surface of said tank and a second position adjacent said vertical surface, said pivotal clamp operable in said first position to permit insertion of said gauge into said tank and in said second position to further secure said gauge to said tank.

8. The gauge of claim 6 and wherein:

said biasing member includes a locking device adapted to slide along said guide device and a spring positioned between said locking device and said clamp member, said locking device having an unlocked configuration and a locked configuration, said locking device operable in said unlocked configuration to permit said locking device to slide along said guide device to allow for insertion of said gauge into said tank and in said locked configuration to interlock said locking device with said guide device in a selected position to securely attach said gauge to said tank.

9. The gauge of claim 8 and wherein:

said locking device further includes a handle for manually displacing said locking device along said guide device.

10. The gauge of claim 8 and wherein:

said locking device comprises a guide block configured to restrain movement of said locking device generally along said guide device, and a wedge plate having an opening therethrough, said opening sized to slidably receive said guide device therein, said wedge plate pivotally cooperating with said guide block to provide said locked and unlocked configurations.

11. The guide of claim 3 and wherein:

said clamping device comprises a pivotal clamp pivotable between a first position remote from a portion of said tank and a second position adjacent said portion of said tank, said pivotal clamp operable in said first position to permit insertion of said gauge into said tank and in said second position to releasably attach said gauge to said tank.

12. The gauge of claim 1 and wherein said guide device comprises:

a tube defining a longitudinal axis, said rod received within said tube; and at least one guide member being operably attached to said tube to restrain displacement of said rod generally along said longitudinal axis.

13. The gauge of claim 12 and wherein:

said at least one guide member is a plate having an opening extending therethrough, said opening being sized to slidably receive said rod therein.

14. The gauge of claim 13 and further comprising:

a second guide member plate attached to said tube to further restrain the displacement of said rod generally along said longitudinal axis, said guide member plates being respectively attached to opposite ends of said tube.

15. The gauge of claim 1 and wherein:

a surface of said rod has indicia markings thereon, said markings readable in reference to a portion of the gauge to indicate the amount of liquid contained in said tank.

16. The gauge of claim 15 and wherein:

said indicia markings are sequential numeric indicia markings corresponding to the level of a liquid in the tank relative to said liquid level reference point.

17. The gauge of claim 1 and wherein:

a surface of said rod has a plurality of color ranges varying along a length of said rod, each of said color ranges corresponding to a liquid level range, said color ranges readable in reference to a portion of the gauge to generally indicate the amount of liquid contained in said tank.

18. The gauge of claim 1 and further comprising:

a retaining member for selective retention of said rod relative to said guide device in a predetermined longitudinal position.

19. The gauge of claim 18 and wherein:

said retaining member comprises a hook operably attached to said rod adjacent said buoyant member, said hook adapted to releasably engage a portion of said reference arm.

20. The gauge of claim 1 and wherein:

said tank is a railroad tank car.

21. A method for determining the amount of liquid contained in a tank having an interior surface defining a liquid level reference point, the method comprising:

providing a portable liquid level gauge including:

an elongate rod having a surface including indicia markings thereon corresponding to the amount of liquid contained in the tank, and a guide device defining a longitudinal axis and including an opening for receiving the rod therein;

positioning the guide device in a predetermined vertical position relative to the liquid level reference point, a portion of the guide device forming an abutting relationship with the interior surface of the tank at the liquid level reference point;

releasably attaching the guide device to a portion of the tank in a substantially vertical orientation;

vertically displacing the rod generally along the longitudinal axis in response to a corresponding change in liquid level; and reading the indicia markings on the rod in reference to a portion of the guide device to determine the amount of liquid contained in the tank.

22. The method of claim 21 and wherein:

the releasably attaching includes clamping the gauge to the portion of the tank, the clamping comprising sliding a clamp member along the guide device and biasing the clamp member against a portion of the tank to releasably attach the gauge to the tank.

23. A portable gauge for indicating the amount of liquid contained in a tank, the gauge comprising:

an elongate rod for indicating the amount of liquid contained in said tank;

a tube defining a longitudinal axis, said rod being slidably received within said tube;

a float operably connected to said rod to cause said rod to be displaced generally along said longitudinal axis in response to vertical displacement of said float resulting from a corresponding change in liquid level;

a vertical clamp for releasably attaching said gauge to said tank, said vertical clamp including a clamp member adapted to slide generally along said longitudinal axis of said tube, and a biasing member for exerting a force onto said clamp member to engage said clamp member in an abutting relationship with a portion of said tank; and a pivotal clamp operably connected to said clamp member, said pivotal clamp pivotable between a first position remote from a portion of said tank and a second position adjacent said portion of said tank, said pivotal clamp operable in said first position to permit insertion of said gauge into said tank and in said second position to further secure said gauge to said tank.

24. The gauge of claim 23 and further comprising:

a reference arm operably connected to said tube, a portion of said reference arm forming an abutting relationship with an interior surface of said tank at a predetermined liquid level reference point.

25. The gauge of claim 23 and further comprising:

a retaining member for selective retention of said rod relative to said tube in a predetermined longitudinal position.

26. A portable gauge, comprising:

an elongate member for indicating the amount of liquid contained in a tank, said elongate member adapted to be buoyantly supported by the liquid;

a support member adapted to guide said elongate member during displacement of said elongate member in response to a corresponding change in liquid level;

a clamp member operably coupled to said support member; and a biasing member for exerting a force onto said clamp member to engage said clamp member in an abutting relationship with a portion of the tank to releasably attach the gauge to the tank.

27. The gauge of claim 26 and further comprising:

a reference member coupled to said support member, a portion of said reference member forming an abutting relationship with an interior surface of the tank at a predetermined liquid level reference point.

28. The gauge of claim 26 and wherein:

the tank includes a collar defining an access opening, said clamp member having one operational configuration permitting the gauge to be at least partially inserted through said access opening and into the tank, and another operational configuration in which said clamp member engages said collar to releasably attach the gauge to the tank.

29. The gauge of claim 26 and wherein:

said clamp member is adapted to slide along a length of said support member.

30. The gauge of claim 29 and wherein:

said biasing member includes a locking device adapted to slide along a length of said support member and a spring disposed between said locking device and said clamp member, said locking device having an unlocked configuration and a locked configuration, said locking device operable in said unlocked configuration to permit said locking device to slide along said support member to allow insertion of the gauge into the tank and in said locked configuration to engage said locking device to said support member in a selected position to securely attach said gauge to said tank.

31. The gauge of claim 30 and wherein:

said locking device comprises a guide block configured to restrain movement of said locking device generally along said support member, and a wedge plate having an opening therethrough, said opening sized to slidably receive said support member therein, said wedge plate pivotally cooperating with said guide block to provide said locked and unlocked configurations.

32. The gauge of claim 21 and wherein:

said clamp member is adapted to pivot relative to said support member between a first position remote from a portion of said tank and a second position adjacent said portion of said tank, said clamp member operable in said first position to permit insertion of said gauge into said tank and in said second position to releasably attach said gauge to said tank.

33. A portable gauge for determining the amount of liquid contained in a tank having an interior surface defining a liquid level reference point, the gauge comprising:

an elongate member including indicia corresponding to the amount of liquid contained in the tank, said elongate member adapted to be buoyantly supported by the liquid;

a support member adapted to guide said elongate member during displacement of said elongate member in response to a corresponding change in liquid level;

a reference member coupled to said support member and forming an abutting relationship with said interior surface of said tank at said liquid level reference point.

34. The gauge of claim 33 and wherein:

said tank includes a collar defining an access opening and extending inwardly from said interior surface of said tank;

said reference arm being configured to form a channel for receiving a portion of said collar therein; and one end of said reference arm being coupled to said support member and an opposite end of said reference arm forming said abutting relationship with said interior surface of said tank at said liquid level reference point.

35. The gauge of claim 33 and further comprising:

a clamp member coupled to said gauge; and a biasing member for exerting a force onto said clamp member to engage said clamp member in an abutting relationship with a portion of the tank to releasably attach the gauge to the tank.

36. The gauge of claim 33 and wherein:

said indicia comprise a plurality of color ranges extending along a length of said elongate member, each of said color ranges corresponding to a respective liquid level range, said color ranges readable in reference to a portion of the gauge to generally indicate the amount of liquid contained in said tank.

* * * * *